(12) United States Patent
Zocher (10) Patent No.: US 10,597,214 B2
(45) Date of Patent: Mar. 24, 2020

(54) COMBINED SHIPPING PROTECTION AND IMPINGEMENT DETECTION WRAP

(71) Applicant: NuScale Power, LLC, Corvallis, OR (US)

(72) Inventor: Marc Alan Zocher, Bainbridge Island, WA (US)

(73) Assignee: NUSCALE POWER, LLC, Portland, OR (US)

( * ) Notice: Subject to any disclaimer, the term of this patent is extended or adjusted under 35 U.S.C. 154(b) by 130 days.

(21) Appl. No.: 15/859,043

(22) Filed: Dec. 29, 2017

(65) Prior Publication Data
US 2018/0186545 A1 Jul. 5, 2018

Related U.S. Application Data

(60) Provisional application No. 62/440,999, filed on Dec. 30, 2016.

(51) Int. Cl.
*B65D 81/03* (2006.01)
*B65D 81/05* (2006.01)
(Continued)

(52) U.S. Cl.
CPC ............... *B65D 81/03* (2013.01); *B32B 3/30* (2013.01); *B32B 7/02* (2013.01); *B32B 7/05* (2019.01);
(Continued)

(58) Field of Classification Search
CPC ..... G01P 15/038; B65D 81/03; B65D 81/052; B65D 79/02; B65D 81/05; B65D 31/02
(Continued)

(56) References Cited

U.S. PATENT DOCUMENTS 4,361,106 A * 11/1982 Eklof .................... G01P 15/036
116/203
4,516,679 A * 5/1985 Simpson ................ B65D 75/52
206/459.1
(Continued)

FOREIGN PATENT DOCUMENTS

JP 2010085132 A 4/2015

OTHER PUBLICATIONS

International Search Report & Written Opinion; PCT/US2017/069101; dated Mar. 16, 2018.
(Continued)

*Primary Examiner* — Brian D Nash
(74) *Attorney, Agent, or Firm* — Schwabe Williamson & Wyatt (57) ABSTRACT

A packaging material comprised of a gas-impermeable base layer, an indicator layer, and a gas-impermeable top layer is disclosed. The top layer is selected to rupture upon experiencing an impingement or impact that exceeds a predetermined threshold. The indicator layer is configured to change visual appearance upon exposure to ambient air. The top layer further may be configured into a plurality of cells, with each cell filled with a gas that is inert with respect to the indicator layer. The cells may be of a size and shape configured to indicate the location and shape of an impingement or impact, to alert a recipient of an item protected by the packaging material of an area that may require further inspection.

17 Claims, 5 Drawing Sheets

US 10,597,214 B2
Page 2

(51) Int. Cl.
| | |
|---|---|
| B65D 79/02 | (2006.01) |
| B32B 7/05 | (2019.01) |
| B32B 27/10 | (2006.01) |
| B32B 3/30 | (2006.01) |
| B32B 29/00 | (2006.01) |
| B32B 27/30 | (2006.01) |
| B32B 7/02 | (2019.01) |
| B32B 27/18 | (2006.01) |
| B32B 27/08 | (2006.01) |

(52) U.S. Cl.
CPC .............. *B32B 27/08* (2013.01); *B32B 27/10* (2013.01); *B32B 27/18* (2013.01); *B32B 27/30* (2013.01); *B32B 27/304* (2013.01); *B32B 29/002* (2013.01); *B65D 79/02* (2013.01); *B65D 81/052* (2013.01); *B32B 2250/02* (2013.01); *B32B 2250/03* (2013.01); *B32B 2255/10* (2013.01); *B32B 2255/12* (2013.01); *B32B 2255/24* (2013.01); *B32B 2255/26* (2013.01); *B32B 2307/40* (2013.01); *B32B 2307/546* (2013.01); *B32B 2307/558* (2013.01); *B32B 2307/7242* (2013.01); *B32B 2307/732* (2013.01); *B32B 2553/00* (2013.01)

(58) Field of Classification Search
USPC .............................. 229/87.02, 91, 5.81, 5.84
See application file for complete search history.

(56) References Cited

U.S. PATENT DOCUMENTS

| | | | | | |
|---|---|---|---|---|---|
| 4,550,546 | A * | 11/1985 | Raley | ..................... | B65D 65/38 206/439 |
| 5,228,573 | A * | 7/1993 | Pavelle | ................ | A61K 9/4883 116/206 |
| 5,323,729 | A * | 6/1994 | Rubey | ................... | G01P 15/036 116/200 |
| 5,582,887 | A * | 12/1996 | Etheredge | ............. | G09F 3/0292 206/807 |
| 5,885,677 | A * | 3/1999 | Gosselin | ............... | G09F 3/0292 283/101 |
| 6,579,580 | B1 * | 6/2003 | Yamada | .................. | B32B 27/08 229/5.81 |
| 6,742,472 | B1 * | 6/2004 | Shigyo | .................... | G01L 1/247 116/200 |
| 6,848,389 | B1 * | 2/2005 | Elsasser | ................. | G01L 5/0052 116/203 |
| 6,953,206 | B1 * | 10/2005 | Dilz | ....................... | B65D 79/02 283/101 |
| 7,219,619 | B2 * | 5/2007 | Fitzer | ..................... | G01P 15/036 116/203 |
| 8,074,489 | B2 * | 12/2011 | Ishikawa | .................. | G01D 3/10 116/202 |
| 8,240,270 | B2 * | 8/2012 | Naruishi | ................ | B65D 79/02 116/200 |
| 8,360,323 | B2 * | 1/2013 | Widzinski, Jr. | ........ | G09F 3/0294 235/487 |
| 8,387,552 | B2 * | 3/2013 | Branch | ................... | G01L 5/0052 116/203 |
| 9,970,833 | B2 * | 5/2018 | Georgeson | ................. | G01L 1/24 |
| 10,189,626 | B2 * | 1/2019 | Bahar | ................... | G01L 5/0052 |
| 2002/0050513 | A1 * | 5/2002 | Player | ....................... | B32B 1/02 229/5.84 |
| 2002/0117421 | A1 * | 8/2002 | Baker | ................... | A61F 5/05833 206/522 |
| 2005/0023178 | A1 * | 2/2005 | Surattee | ................. | B65D 79/02 206/524.4 |
| 2005/0217558 | A1 * | 10/2005 | Fitzer | ..................... | G01P 15/036 116/203 |
| 2006/0286407 | A1 * | 12/2006 | Amano | ................... | B32B 27/08 428/690 |
| 2007/0251912 | A1 * | 11/2007 | Sixou | ..................... | B65D 79/02 215/263 |
| 2010/0293892 | A1 * | 11/2010 | Curry | ................. | A61B 5/14532 53/403 |
| 2011/0144539 | A1 * | 6/2011 | Ouchi | .................... | A42B 3/046 600/587 |
| 2012/0312071 | A1 | 12/2012 | Branch | | |

OTHER PUBLICATIONS

International Preliminary Report on Patentability for International Application No. PCT/US2017/069101, dated Jul. 11, 2019, pp. 8.

* cited by examiner

COMBINED SHIPPING PROTECTION AND IMPINGEMENT DETECTION WRAP

STATEMENT OF RELATED MATTERS

This application claims priority to U.S. Provisional Patent Application No. 62/440,999, filed on 30 Dec. 2016, the contents of which are herein incorporated by reference in their entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to packaging materials, and particularly to protective wrapping materials that provide indications of possible contents damage.

BACKGROUND

Wraps, damage, or shipping protection including pillows of air, "bubble wrap", "packing peanuts", compressible or non-compressible foam, wrapping or the like is used to protect the movement or transport of parts, items or packages ("PIoP", or generically as "objects" herein) worldwide. The primary purpose of this packaging is to reduce the likelihood of damage to the PIoP.

Some types of shipping protection or impingement or shock detection include the ability to detect shock, vibration, temperature conditions or other resulting environmental conditions such that the PIoP will register that additional inspection is required. A damaged cardboard box containing an item would undergo further inspection to make sure the packaged item is not broken, damaged, or otherwise rendered non-usable for the purpose intended.

Although the packaging industry has developed ways to protect items that would be damaged upon impingement or impact, most packaging or wrapping options provide very little in the way of locating the point or area of impact other than obvious deformation of the PIoP. It is possible to accept delivery of a PIoP that does not have any outward indication of mishandling or otherwise be rendered unacceptable for its intended use. An example may be a TV or computer monitor that must be powered on to determine if one or more screen pixels have been damaged. In addition, this damage may be a very small area on a very large object such that inspection of the entire surface or object must be undertaken. Such impacts and abrasions can be encountered with everyday shipping or transportation activities, including activities such as simply moving an item within a storage area or moving items a significant distance by air, truck, or rail. Such impacts and abrasions can be very costly, and can even result in rendering the PIoP unusable for its intended purpose.

SUMMARY

Example 1 includes a packaging material, comprising a gas-impermeable base layer; an indicator layer disposed upon the base layer; and a gas-impermeable top layer continuously disposed over the indicator layer; wherein the indicator layer is configured to visibly change appearance in a location where the top layer is broken.

Example 2 may include the packaging material of example 1, wherein the top layer forms a plurality of cells, and a portion of the indicator layer is exposed to an interior of each cell.

Example 3 may include the packaging material of example 2, wherein each of the plurality of cells is filled with a gas, and the portion of the indicator layer exposed to the interior of a cell visibly changes appearance where the gas escapes upon the top layer breaking over the cell.

Example 4 may include the packaging material of example 3, wherein the indicator layer comprises a material that visibly changes appearance upon exposure to air, and the gas in each of the plurality of cells is substantially inert with respect to the indicator layer.

Example 5 may include the packaging material of example 4, wherein the indicator layer material comprises a material that visibly changes appearance upon exposure to atmospheric oxygen, and the gas in each of the plurality of cells is nitrogen.

Example 6 may include the packaging material of example 5, wherein the top layer has a thickness selected to break upon experiencing a force greater than a predetermined level.

Example 7 may include the packaging material of example 6, wherein subjecting a portion of the packaging material to a force greater than the predetermined level results in the top layer of the plurality of cells in the portion of the material to break.

Example 8 may include the packaging material of example 7, wherein the indicator layer visibly changes appearance by changing color in the plurality of cells in the portion of the material.

Example 9 may include a method for preparing a packaging material, comprising: providing a gas-impermeable base layer; disposing an indicator layer upon the base layer; and disposing a gas-impermeable top layer continuously over the indicator layer; wherein the indicator layer is configured to visibly change appearance in a location where the top layer is broken.

Example 10 may include the method of example 9, wherein disposing the top layer continuously over the indicator layer comprises intermittently disposing the top layer upon the indicator layer to form a plurality of cells, with a portion of the indicator layer exposed to the interior of each cell.

Example 11 may include the method of example 10, wherein the portion of the indicator layer exposed to the interior of a cell visibly changes appearance upon the top layer breaking over the cell.

Example 12 may include the method of example 10, wherein intermittently disposing the top layer upon the indicator layer is carried out within a gas environment such that each of the plurality of cells is filled with the gas.

Example 13 may include the method of example 12, wherein the indicator layer visibly changes appearance upon exposure to air, and the gas does not cause the indicator layer to visibly change appearance.

Example 14 may include the method of example 13, wherein the indicator layer visibly changes appearance upon exposure to atmospheric oxygen, and the gas is nitrogen.

Example 15 may include the method of example 9, further comprising selecting a material thickness for the top layer so that the top layer will break upon experiencing a force greater than a predetermined level.

Example 16 may include the method of example 9, further comprising selecting a material for the base layer that has a thickness equal to or greater than the material selected for the top layer.

Example 17 may include the method of example 9, further comprising selecting a material for the indicator layer that visibly changes appearance by changing color.

Example 18 may include a packaging sheet, comprising a gas-impermeable base layer; a gas-impermeable top layer disposed over the base layer to create a plurality of cells, each of the plurality of cells filled with a gas that is inert with respect to the indicator layer; and an indicator layer disposed upon the base layer within each of the plurality of cells, the indicator layer to change visual appearance upon exposure to air, wherein a rupture of a cell of the plurality of cells will result in the indicator layer within the cell to change visual appearance.

Example 19 may include the packaging sheet of example 18, wherein the plurality of cells is arranged over an item to be protected, and an impingement or impact upon the item exceeding a predetermined threshold will cause at least one cell in an area of the impingement or impact to rupture, while cells not in the area of impingement will not rupture.

Example 20 may include the packaging sheet of example 18, wherein the sheet is affixed to an item personal to a user to indicate a location where the user experiences an impact greater than a predetermined threshold.

DETAILED DESCRIPTION

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The disclosed packaging materials may be constructed from a series of layers, particularly, a base layer and top layer that are gas impermeable, which surround and encapsulate an indicator layer between the top layer and base layer. The indicator layer may be configured to change visual appearance upon exposure to ambient air. By configuring the top layer into a series of bubbles or cells, similar to bubble wrap, the packaging material can afford some cushioning and/or shock protection to PIoPs upon which it is wrapped. Further, each cell may be filled with a gas that is inert with respect to the indicator layer (e.g. won't trigger a change in visible appearance), with the indicator layer exposed to the interior of each cell. If a cell in such a configuration ruptures, the inert gas will escape and leave the indicator layer exposed to ambient air, thus triggering the change in visual appearance.

By using a packaging material configured with a matrix of inert gas-filled cells overlying an ambient air-sensitive indicator layer, not only the fact that a PIoP has experienced a potentially damaging impact or impingement may be determined, but also the location, size and shape of the impact or impingement may be disclosed. This may enable a recipient of the PIoP to ascertain whether the shipped PIoP may have experienced damage during transit using only a relatively quick visual inspection. Further, by knowing the size, shape, and location of the impact or impingement, a more detailed inspection can be localized to those parts of the PIoP most likely to have been affected by the impact or impingement.

Figure 1:
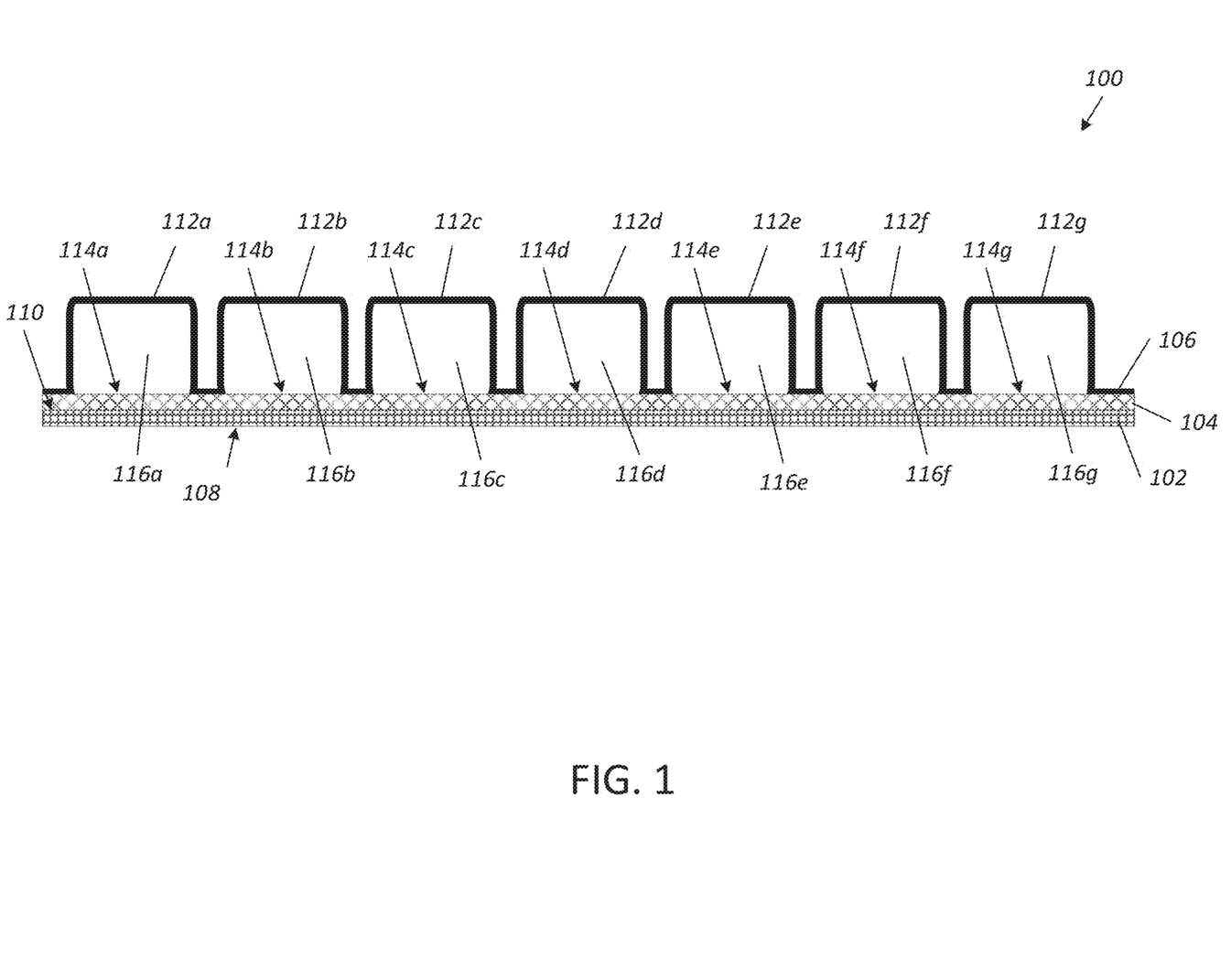
FIG. 1 illustrates the layers of construction of a packaging material for shipping protection and impingement detection, according to some embodiments.

FIG. 1 illustrates a packaging material 100 according to some embodiments. Packaging material 100 may include a gas-impermeable base layer 102, an indicator layer 104 disposed upon the base layer 102, and a gas-impermeable top layer 106 continuously disposed over the indicator layer 104. As will be discussed in greater detail herein, the indicator layer 104 may be configured to visibly change appearance in a location where the top layer 106 is broken.

Base layer 102 may be manufactured from an essentially gas-impermeable material. In embodiments where packaging material 100 is to be used for wrapping and protecting objects that may have a curved or angled shape (e.g. a round or cylindrical object, or objects that are comprised of multiple shapes), base layer 102, as well as indicator layer 104 and/or top layer 106, may be manufactured from flexible materials such as vinyl, foil, PVC, rubber, or other similar impermeable flexible materials, or a combination of one or more such materials. In some other embodiments, base layer 102 may be manufactured from rigid or semi rigid materials including metal or plastic board. Still further, materials employed for base layer 102 may be manufactured from a combination of materials, such as a paper or cardboard sheet that can be treated with a plastic or varnish coating to render it gas impermeable.

In embodiments, base layer 102 may be implemented as a sheet with a bottom side 108 and a top side 110. Onto bottom side 108, which may face the object to be protected, additional layers or coatings may be applied, such as an adhesive to allow packaging material 100 to be directly applied and retained to an object without the need for other retention means such as tape, rope, clamps, or similar implements. This adhesive may be of any type and configuration to secure packaging material 100 to the object intended to be protected. Consideration may be given to the nature of the object so that a selected adhesive or combination of adhesives does not damage the surface of the protected object to which packaging material 100 is adhered.

Onto top side 110 of base layer 102, indicator layer 104 may be disposed. Indicator layer 104 may include a material or materials designed to change visual appearance upon exposure to the atmosphere. For example, some embodiments may employ a compound or chemical that changes color upon exposure to the ambient oxygen in the atmosphere. Examples of compounds that may be usable with indicator layer 104 include methylene blue, para-benzoquinone, or related family chemicals. Alternatively or additionally, any compound now known or later developed that may change appearance upon exposure to the atmosphere may be usable. Other compounds may change visual appearance by changing size and/or texture. Some compounds may change appearance upon exposure to other atmospheric elements, such as water vapor, nitrogen, carbon dioxide, or another gas. The choice of compound for indicator layer 104 may be made with regard to the intended application(s) of packaging material 100 and the particular shipping environment for the protected object. In some embodiments, a combination of compounds may be used.

Indicator layer 104 may be comprised partially or entirely of the compound or chemical that changes visual appearance. Some embodiments of indicator layer 104 may have the compound or chemical integrated into a substrate or matrix, such as a polymer or plastic. Other embodiments of indicator layer 104 may have the indicator compound or chemical comprise the entirety of layer 104. In still other embodiments, indicator layer 104 may be implemented as a coating or fluid that is deposited upon base layer 102, or upon top layer 106.

Top layer 106 may be implemented using materials such as plastic (e.g. vinyl, PVC), cellulose, or another film-like material that is substantially transparent or translucent, as well as gas impermeable. Depending upon the type of compound use for indicator layer 104, other more opaque materials could also be used in other embodiments. In some embodiments, top layer 106 is configured to allow indicator layer 104 to be visible when viewing packaging material 100 as it is placed upon a protected object. Specifically, top layer 106 may be configured so that indicator layer 104 is visible in such a way that a change in its visual appearance will be readily visible. This enables a person inspecting the object to quickly see whether the protected object has experienced a potentially damaging impingement or impact, as well as where the object experienced the impingement or impact.

Top layer 106 is disposed upon indicator layer 104 and/or upon base layer 102, depending upon the configuration of a given embodiment of packaging material 100. As can be seen in FIG. 1, the combination of base layer 102, indicator layer 104 and top layer 106 may form a sandwich, wherein indicator layer 104 is sealed from the atmosphere by gas-impermeable base layer 102 and top layer 106. Thus, indicator layer 104 is prevented from undergoing a visible change in appearance by virtue of base layer 102 and top layer 106. If top layer 106 breaks so as to expose indicator layer 104, indicator layer 104 may undergo a visual appearance change at least where top layer 106 is broken, effectively indicating the location of the break.

It will be appreciated by a person skilled in the relevant art that if base layer 102 breaks to expose indicator layer 104, indicator layer 104 may undergo a visual change. Because of this, base layer 102 may be selected to be of a type and thickness of material sufficient to ensure that it is not inadvertently broken. In contrast, top layer 106 may be selected to be of a type and thickness of material sufficient to ensure that it breaks upon experiencing an impingement or force of a predetermined amount. As a result, base layer 102 may be of the same or a greater thickness than top layer 106. Thus, a visual change in indicator layer 104 will indicate that packaging material 100, and any object to which it is attached, has experienced an impingement or force at least as great as the predetermined amount. This predetermined amount may be selected to be of a level that may cause the protected object to experience damage. If indicator layer 104 is visually changed, then, the protected object may be inspected to determine whether it has damage that may need addressing.

In embodiments, top layer 106 may be configured into a plurality of cells 112*a* to 112*g*, similar to bubble wrap-type sheet packaging. Where top layer 106 forms cells 112*a* to 112*g*, portions of indicator layer 114*a* to 114*g* may be exposed to the interior 116*a* to 116*g* of their respective cells 112*a* to 112*g*. As will be described in more detail below, the interiors 116*a* to 116*g* may be filled with a gas that is inert with respect to the chosen compound for indicator layer 104. In embodiments with such a configuration, if top layer 106 breaks over a cell 112*a* to 112*g*, the respective portions of indicator layer 114*a* to 114*g* may change visual appearance as the gas that was trapped in respective interior 116*a* to 116*g* escapes, and the respective portion of indicator layer 114*a* to 114*g* is exposed to air. Top layer 106 may break at a predetermined force that is selected with respect to a desired breakpoint for each cell 112*a* to 112*g*, at which point a cell 112*a* to 112*g* experiencing a force in excess of the predetermined level will rupture, and cause its portion of indicator layer 114*a* to 114*g* to change visual appearance as a result of the loss of the inert gas in interior 116*a* to 116*g*.

Figure 2A:
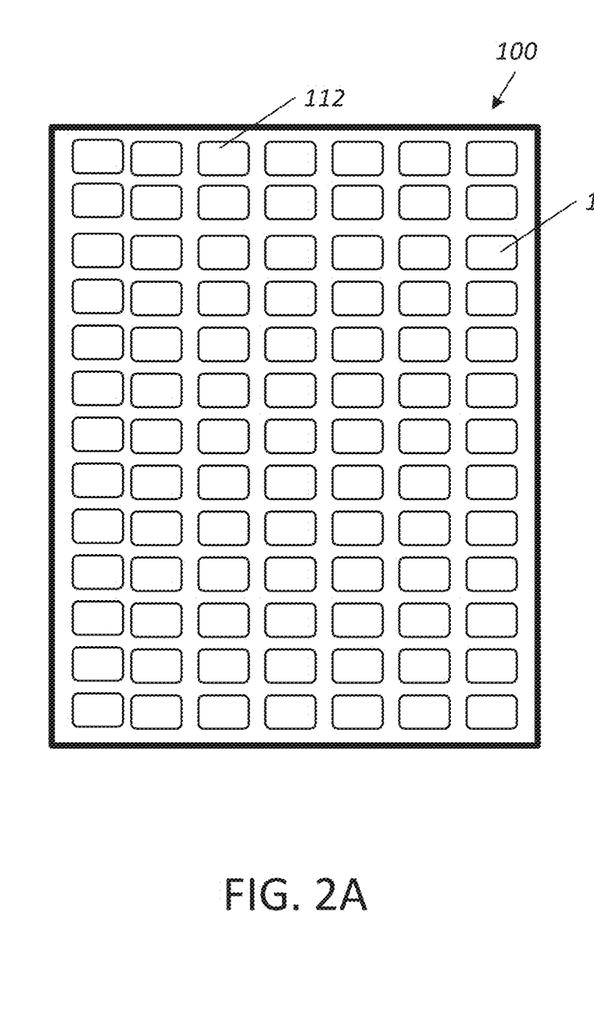
FIG. 2A illustrates a possible arrangement of cells for a packaging material, according to some embodiments.

Turning to FIG. 2A, an example embodiment of packaging material 100 is depicted. As can be seen, packaging material 100 is implemented as a "bubble wrap" sheet, with a plurality of cells 112 appearing approximately rectangular and arranged in a grid pattern. It will be appreciated that cells 112 could also be configured in different shapes, e.g. round, polygonal, and may be arrayed in different patterns, such as a honeycomb or interleaved pattern. Further, some embodiments may have cells 112 of varying sizes and shapes on a single sheet. The selection of size, shape, and arrangement of cells 112 may depend upon a particular intended application for packaging material 100. FIG. 2A also shows all cells as being intact, with no visual changes to the appearance of indicator layer 104.

Figure 2B:
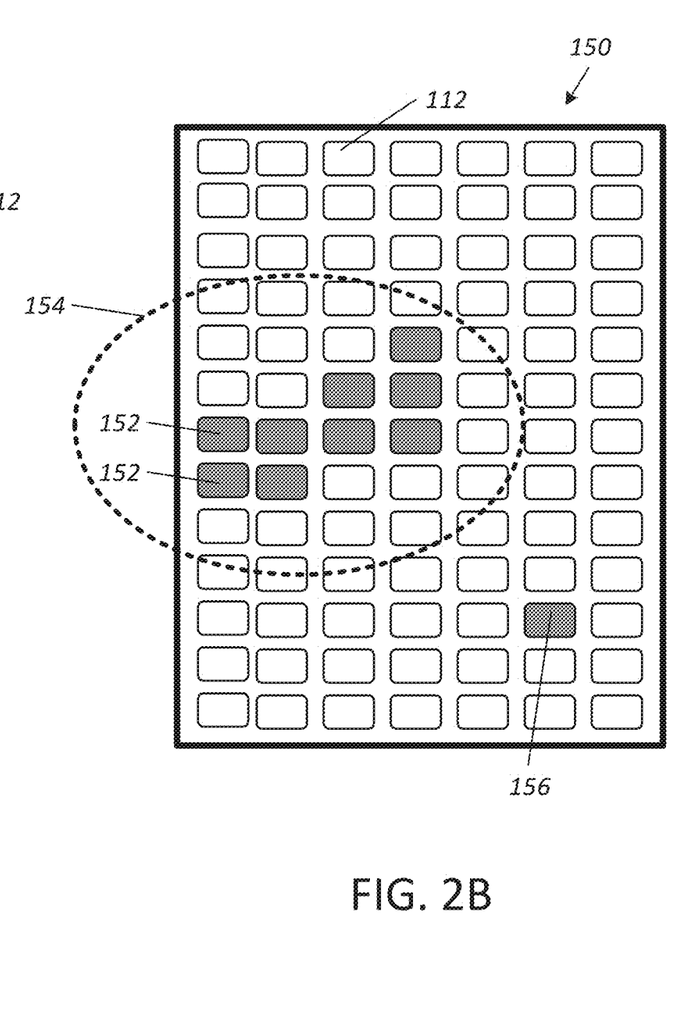
FIG. 2B illustrates the arrangement of cells in FIG. 2A, where the cells in some portions of the packaging material have been ruptured and caused a visible appearance change, according to some embodiments.

Referring to FIG. 2B, a packaging material 150 similar to packaging material 100 in FIG. 2A is depicted, with several of its various cells having been ruptured, such as by experiencing a force greater than the predetermined threshold for top layer 106 breaking and/or due to a direct impingement upon a particular cell. FIG. 2B demonstrates a functionality of packaging material 100 to indicate specific areas where a protected object may have experienced a damaging force or impingement. Packaging material 150 includes a plurality of unruptured cells 112, which are indicated as white/clear. Packaging material also includes a plurality of ruptured cells 152, which are indicated by a shaded appearance, indicative that the indicator layer 104 under each ruptured cell 152 has been exposed to ambient air due to the loss of the inert gas in each cell 152, and thus has undergone a change in visual appearance. The impact area 154 upon a protected object is clearly indicated, with the array of ruptured cells 152 (and corresponding change in visual appearance for each) indicating the shape and area of the impact. Thus, a user may be alerted to inspect the protected object around impact area 154 to determine whether the object sustained damage. FIG. 2B also includes a lone ruptured cell 156, which may be indicative of an impingement. As with impact area 154, the user is alerted by the change in visual appearance to indicator layer 104 beneath ruptured cell 156, and can inspect the protected object for damage in that particular area. Areas with no ruptured cells (cells 112), are likely to not have experienced damage. In this way, an object protected by packaging material 100 can be quickly and readily inspected for possible damage, such as may be experienced during shipping of the object.

As will be understood by a person skilled in the relevant art, the selection of packaging material 100 may be made with respect to the predetermined threshold for top layer 106 to break, as well as with respect to the size and layout of cells 112. Objects that are relatively impact insensitive may be wrapped with a packaging material 100 that includes a relatively thick or durable top layer 106, designed to break only from relatively high amounts of force or impingements. Conversely, objects that are particularly fragile may be wrapped with a packaging material that has a relatively thin or fragile top layer 106, that ruptures easily. Packaging material 100 may be manufactured with a range of different types of top layer 106 to suit a wide variety of objects of varying fragility, allowing a user to select an appropriate packaging material 100 with a predetermined threshold for rupture that is just below a point at which the protected object may experience damage. It is possible that one or more cells 112 may be ruptured inadvertently during manufacture or in the process of packaging an object in some circumstances, which cells would also undergo a change in visual appearance but without corresponding damage to the object. In such events, an inspection of the underlying object would indicate no damage.

It will also be appreciated by a person skilled in the relevant art that the particular size and layout of cells 112 may be varied depending upon the object to be wrapped, as well as to a desired level of definition of an impact. Where cells 112 are of a smaller size, impact area 154 may be more clearly defined, similar to how smaller pixels on a display are capable of rendering objects with greater detail and accuracy. However, smaller cells may offer less in way of cushioning. Larger cells may offer greater cushioning, but at the expense of a more general indication of where an impact or impingement may have been experienced.

Still further, some embodiments may use a variety of cell sizes, shapes, and layouts on a single packaging material 100 to provide a hybrid of benefits, including tailored indications of impacts or impingements. Using multiple cell sizes may also allow packaging material 100 to be equipped with multiple top layers 106 of varying thicknesses and predetermined breaking thresholds. Using cells with differing predetermined breaking thresholds may allow determining the approximate force experienced by a protected object on the basis of which cells 112 are broken. Yet other embodiments may use different compounds for indicator layer 104 corresponding to different cell sizes, allowing for a fast visual determination of the forces experienced by a protected object on the basis of visual appearance.

Figure 3A:
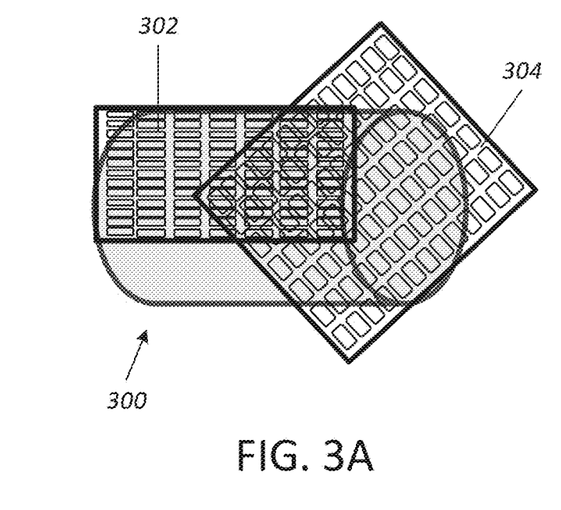
FIG. 3A illustrates one possible way of packaging a cylindrical object with the disclosed packaging materials, according to some embodiments.
Figure 3B:
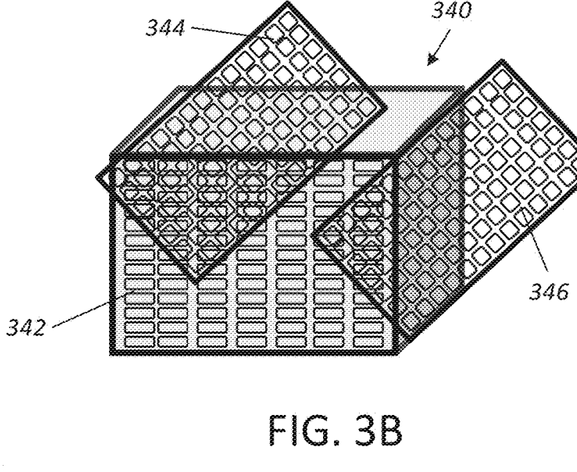
FIG. 3B illustrates one possible way of packaging a box-shaped object with the disclosed packaging materials, according to some embodiments.
Figure 3C:
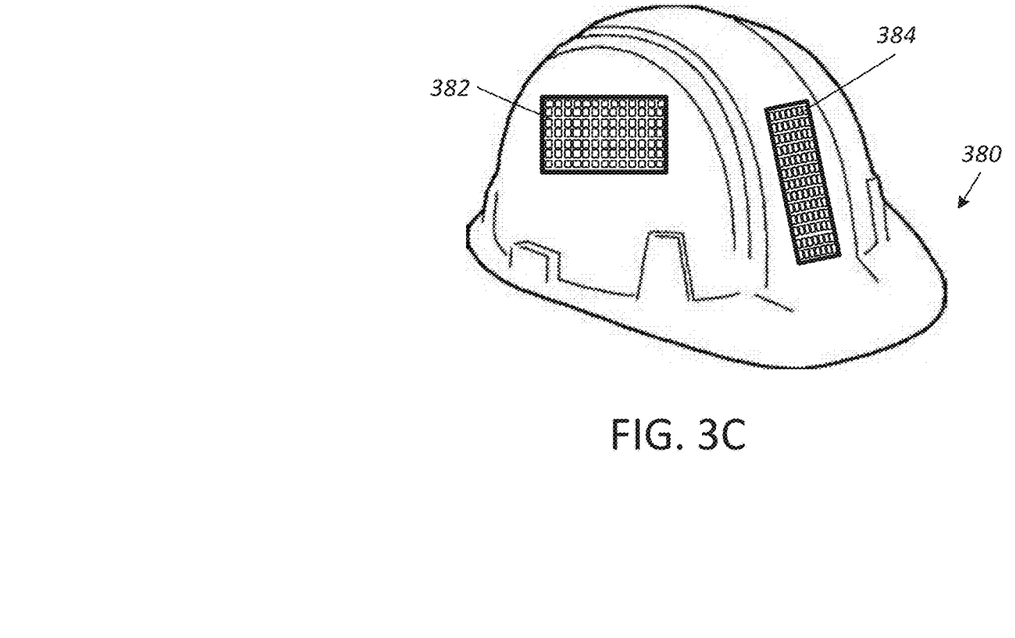
FIG. 3C illustrates a way to employ the disclosed packaging materials on a personal item, according to various embodiments.

FIGS. 3A, 3B, and 3C depict various objects and ways in which they each may be protected by packaging material 100. FIG. 3A depicts an object 300 that's approximately cylindrical in shape. A first material sheet 302 may be affixed to the side of object 300, and a second material sheet 304 may be affixed to an end of object 300. As described above, each material sheet 302 and 304 may include cells of differing sizes and arrangements, and may be configured to rupture at different predetermined thresholds. Such configurations may be appropriate where different portions of object 300 may be impact-sensitive in varying amounts (e.g. the sides of object 300 may be configured to absorb a greater impact than the ends).

FIG. 3B depicts an object 340 that's approximately box-shaped. As with object 300, a first material sheet 342 may be affixed to one of the faces of object 340. Additional material sheets 344 and 346 may be affixed to different faces, or across several faces of object 340. As can be seen in FIG. 3B, material sheets 344 and 346 have different cell arrangements in terms of size and layout from material sheet 342. These different cell arrangements may allow material sheets 344 and 346 to have a greater resolution of indicating the shape and position of an impact experienced by object 340 and, as described above, may be configured to rupture at different predetermined thresholds depending upon the particular needs of object 340.

FIG. 3C depicts material sheets 382 and 384 affixed to a personal item 380, here, a hard-hat. Personal item 380 may be any item that is worn by or used by a user, such as personal protective equipment or clothing. Examples may include helmets, masks/shields, jackets, trousers, shoes, gloves, child seats, sports uniforms, on the human body, or any other item that may be donned, used, or receive an impact by a user, and which may be intended to protect the user from impacts or impingements. Other personal items 380 may not offer significant protection, but may be worn by a user to indicate if the user has experienced an impact or impingement that may result in injury sufficient to require medical attention. Material sheets 382 and 384 thus may indicate when personal item 380 has experienced in impact greater than a predetermined threshold. The predetermined threshold may be selected with respect to the type of personal item 380 as well as the tolerance of a user of personal item 380.

For example, where item 380 is a hard hat or other personal protective equipment, material sheets 382 and/or 384 may be configured to rupture (and change visual appearance) if personal item 380 experiences an impact or impingement of sufficient force to compromise the safety aspects of personal item 380. Helmets, hard hats, and child seats typically are rated to absorb a rated impact only once in a sacrificial manner, after which the personal item 380 no longer offers the same level of protection, and thus may be unsafe to rely upon. Whether a personal item has experienced such a compromising blow may not be visually apparent, however. By using material sheets 382 and/or 384 that are configured to rupture with a blow sufficient to compromise the integrity of personal item 380, however, a quick visual inspection after an impact can reveal whether the personal item 380 still offers an appropriate level of protection. As with objects 300 and 340, material sheets 382 and 384 may be configured to rupture at different levels where personal item 380 is designed to withstand blows of varying forces across its surface.

Still further, items of clothing may be equipped with material sheets configured to rupture if a wearer of the clothing experiences an impingement or impact of a sufficient level to cause injury. The use of packaging material 100 may not only can indicate that a user has experienced an impact trauma, but can also indicate the particular shape of an impact to better inform medical personnel of the nature of the trauma, and allow for more effective treatment.

For example, packing material 100 may be located on a football helmet. Top layer 106 in FIG. 1 may be formed to have a breaking force that when applied to the head or helmet of a football player may indicate a possible concussion. If the cells of material 100 are broken on any football helmet during a football game, football officials may remove that football player from the game for medical treatment or observation. Thus, material 100 may identify possible trauma events that are not readily observable.

Figure 4A:
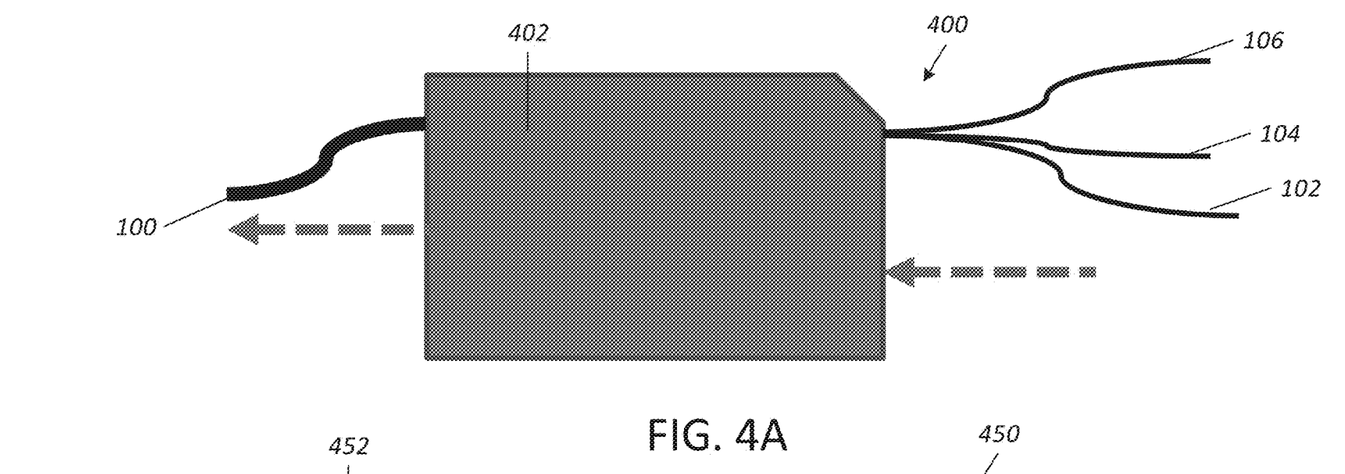
FIG. 4A illustrates one possible way of assembling a packaging material according to some embodiments.
Figure 4B:
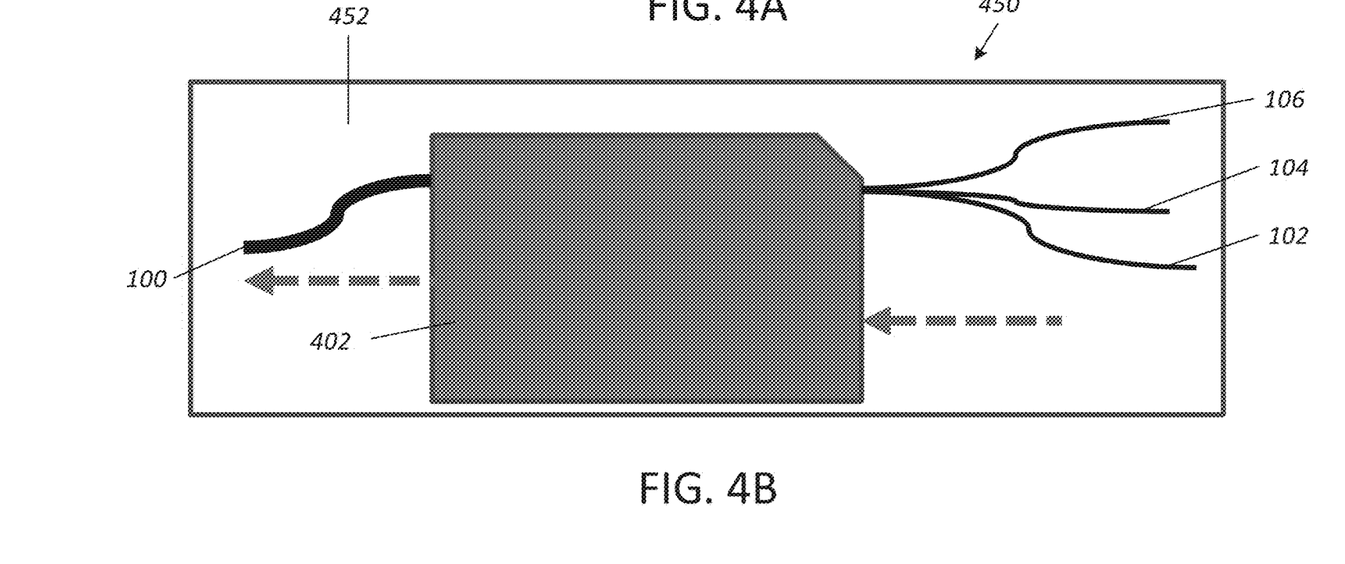
FIG. 4B illustrates a second way of assembling a packaging material according to other embodiments.

FIGS. 4A and 4B depict two different possible assembly procedures 400 and 450 for assembling packaging material 100 so as to ensure that top layer 106 traps an inert gas (with respect to indicator layer 104) in various cells. In FIG. 4A, for assembly procedure 400, base layer 102, indicator layer 104 and top layer 106 may enter into an assembly compartment 402, where the top layer 106 may be formed into cells, and indicator layer 104 is encapsulated between base layer 102 and top layer 106. Assembly compartment 402 may provide a sealed environment filled only with an inert gas with respect to indicator layer 104. Packaging material 100 is assembled and sealed inside this inert gas environment, so that when cells are formed in top layer 106, each cell is filled with the inert gas, such as nitrogen where indicator layer 104 visually changes in response to exposure to ambient oxygen. Packaging material 100 then exits from assembly compartment 402.

The assembly procedure 450 depicted in FIG. 4B extends the concept of assembly compartment 402 to a room 452, where room 452 houses the entire assembly line. Here, room 452 is filled with an inert gas environment so that, as with assembly compartment 402, packaging material 100 is formed and assembled with each cell enclosing an inert gas. The choice between assembly procedure 400 and 450 may depend upon the configuration of packaging material 100 as well as the scale of operations. Assembly of small runs of packaging material may be more effectively accomplished in a room environment, where the actual assembly equipment is relatively small and either requires minimal manipulation, or can be manipulated remotely. Conversely, large scale assembly across a number of lines may require a sealed assembly compartment 402 (or multiples of such compartments), as it may not be feasible to create an inert environment in a large room, particularly if personnel must tend to the machines and would otherwise require a breathing apparatus. Discrete assembly compartments may be opened, serviced, and quickly evacuated to reestablish the inert environment.

Figure 5:
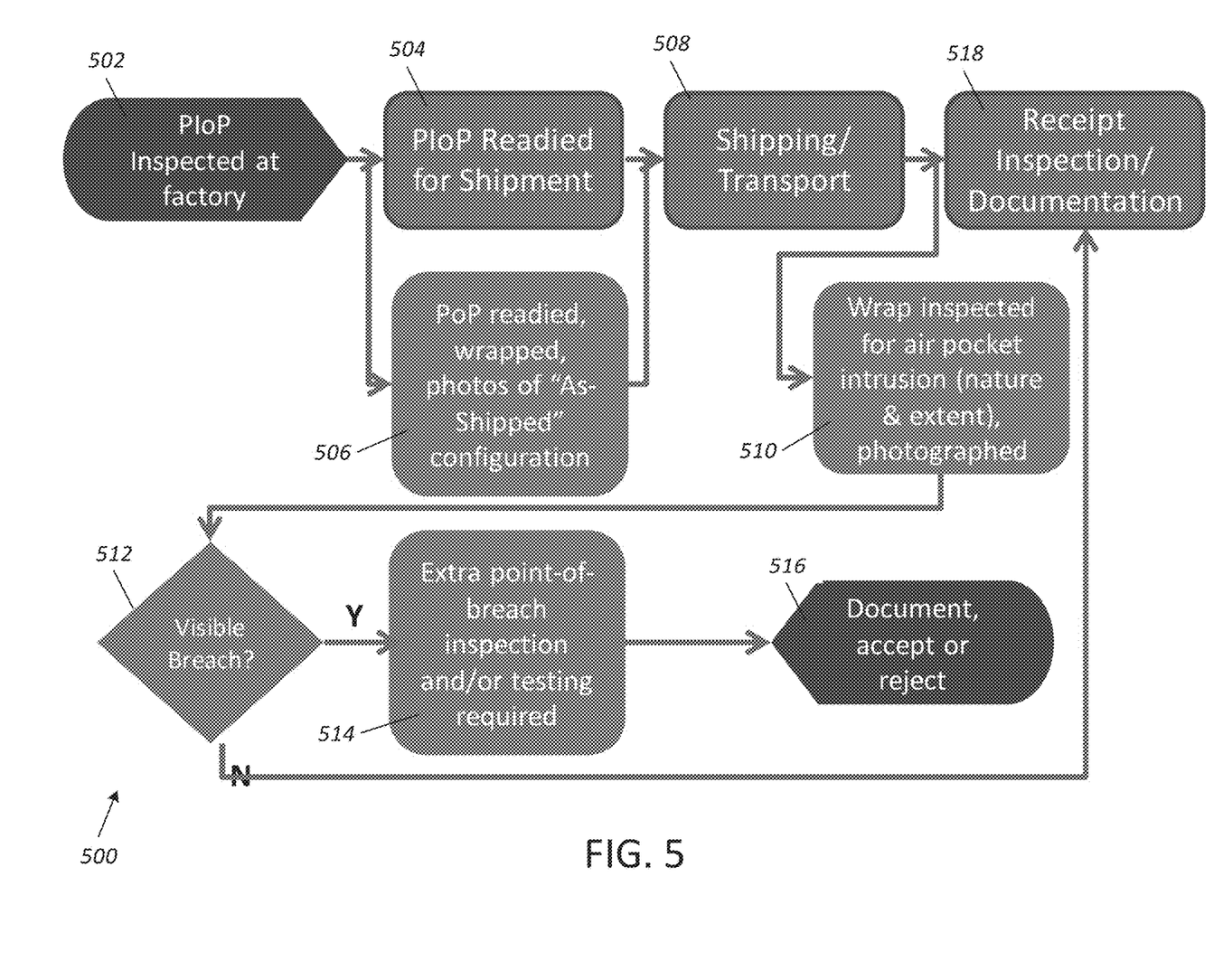
FIG. 5 illustrates one possible process for packing and shipping an object using the disclosed packing material, according to various embodiments.

FIG. 5 depicts an example process 500 by which packaging material 100 may be employed to protect an object (here, referred to as a PIoP—parts, items or packages). Some or all of these steps may be employed for shipping a PIoP with packaging material 100. Examples of objects that may benefit from protection with packaging material 100 include items intended for use in critical environments, such as nuclear reactors, where a failure can result in a major environmental catastrophe. Beginning in block 502, the PIoP may be initially inspected at its factory for any damage resulting from manufacture. Provided the PIoP is damage-free, it may be readied for shipment in block 504. As part of readying the PIoP for shipment, in block 506 it may be wrapped with packaging material 100, and photos of the PIoP with unruptured packaging material 100 may be taken to provide documentary proof that the PIoP has not experienced a damaging impact or impingement. The item is then shipped or otherwise transported to its destination in block 508.

Upon receipt, the PIoP is inspected in block 510 for impingement and/or impact. This is easily accomplished with packaging material 100, where the location and shape of any impact or impingement can be readily seen by visually inspecting packaging material 100, and looking for any locations/cells where indicator layer 104 may have changed visual appearance due to ruptured cells. If a breach is visible from packaging material 100, in block 512, the receiver may engage in further inspection of the PIoP in block 514, particularly in the areas where packaging material 100 has changed visual appearance. Any damage may be documented, and a decision made whether to accept or reject the shipped PIoP in block 516. If, however, no visible breach is seen in block 512, the item may be accepted and the lack of damage documented in block 518.

Although a number of the examples provided herein have primarily described a packaging material configured in the form of bubble-wrap, it should be apparent to one skilled in the art that at least some of the examples may be applied to other types and configurations of packaging materials. For example, one or more of the examples or variations thereof may also be implemented as a flat sheet, where the material doesn't provide cushioning, but nevertheless can indicate the shape and location of an impingement or impact based solely upon breaking of the top layer. Moreover, other configurations of packaging material in shapes other than sheets may be realized, e.g. a shipping container or other three-dimensional object may be implemented with an indicator layer that changes visual appearance upon puncture or impact with a sealing top layer.

Having described and illustrated various examples herein, it should be apparent that other examples may be modified in arrangement and detail. We claim all modifications and variations coming within the spirit and scope of the subject matter claimed herein.

What is claimed is:

1. A packaging material, comprising:
  a gas-impermeable base layer;
  an indicator layer disposed upon the base layer; and
  a gas-impermeable top layer continuously disposed over the indicator layer;
  wherein the top layer forms a plurality of cells, and a portion of the indicator layer is exposed to an interior of each cell, and wherein each of the plurality of cells is filled with a gas, and the portion of the indicator layer exposed to the interior of the cell visibly changes appearance where the gas escapes upon the top layer breaking over the cell.

2. The packaging material of claim 1, wherein the indicator layer comprises a material that visibly changes appearance upon exposure to air, and the gas in each of the plurality of cells is substantially inert with respect to the indicator layer.

3. The packaging material of claim 2, wherein the indicator layer material comprises a material that visibly changes appearance upon exposure to atmospheric oxygen, and the gas in each of the plurality of cells is nitrogen.

4. The packaging material of claim 1, wherein the top layer has a thickness selected to break upon experiencing a force greater than a predetermined level.

5. The packaging material of claim 4, wherein subjecting a portion of the packaging material to a force greater than the predetermined level results in the top layer of the plurality of cells in the portion of the material to break.

6. The packaging material of claim 5, wherein the indicator layer visibly changes appearance by changing color in the plurality of cells in the portion of the material.

7. A method for preparing a packaging material, comprising:
providing a gas-impermeable base layer;
disposing an indicator layer upon the base layer;
disposing a gas-impermeable top layer continuously over the indicator layer;
selecting a material thickness for the top layer so that the top layer will break upon experiencing a force greater than a predetermined level; and
wherein the indicator layer is configured to visibly change appearance in a location where the top layer is broken.

8. The method of claim 7, wherein disposing the top layer continuously over the indicator layer comprises intermittently disposing the top layer upon the indicator layer to form a plurality of cells, with a portion of the indicator layer exposed to the interior of each cell.

9. The method of claim 8, wherein the portion of the indicator layer exposed to the interior of a cell visibly changes appearance upon the top layer breaking over the cell.

10. The method of claim 8, wherein intermittently disposing the top layer upon the indicator layer is carried out within a gas environment such that each of the plurality of cells is filled with the gas.

11. The method of claim 10, wherein the indicator layer visibly changes appearance upon exposure to air, and the gas does not cause the indicator layer to visibly change appearance.

12. The method of claim 11, wherein the indicator layer visibly changes appearance upon exposure to atmospheric oxygen, and the gas is nitrogen.

13. The method of claim 7, further comprising selecting a material for the base layer that has a thickness equal to or greater than the material selected for the top layer.

14. The method of claim 7, further comprising selecting a material for the indicator layer that visibly changes appearance by changing color.

15. A packaging sheet, comprising: a gas-impermeable base layer; a gas-impermeable top layer disposed over the base layer to create a plurality of cells; and an indicator layer disposed upon the base layer within each of the plurality of cells, the indicator layer to change visual appearance upon exposure to air, wherein each of the plurality of cells is filled with a gas that is inert with respect to the indicator layer, and wherein a rupture of a cell of the plurality of cells will result in the indicator layer within the cell to change visual appearance.

16. The packaging sheet of claim 15, wherein the plurality of cells is arranged over an item to be protected, and an impingement or impact upon the item exceeding a predetermined threshold will cause at least one cell in an area of the impingement or impact to rupture, while cells not in the area of impingement will not rupture.

17. The packaging sheet of claim 15, including a hat, helmet, or article of clothing affixed to the sheet to indicate a location on the hat, helmet, or article of clothing that experiences an impact greater than a predetermined threshold.

* * * * *

UNITED STATES PATENT AND TRADEMARK OFFICE
CERTIFICATE OF CORRECTION

PATENT NO. : 10,597,214 B2
APPLICATION NO. : 15/859043
DATED : March 24, 2020
INVENTOR(S) : Marc Alan Zocher Page 1 of 1

It is certified that error appears in the above-identified patent and that said Letters Patent is hereby corrected as shown below:

On the Title Page

In item (56), in Column 2, under "Other Publications", Line 1, delete "PCT/U52017/" and insert -- PCT/US2017/ --, therefor.

Signed and Sealed this
Twentieth Day of October, 2020

Andrei Iancu
*Director of the United States Patent and Trademark Office*